Figure 1:
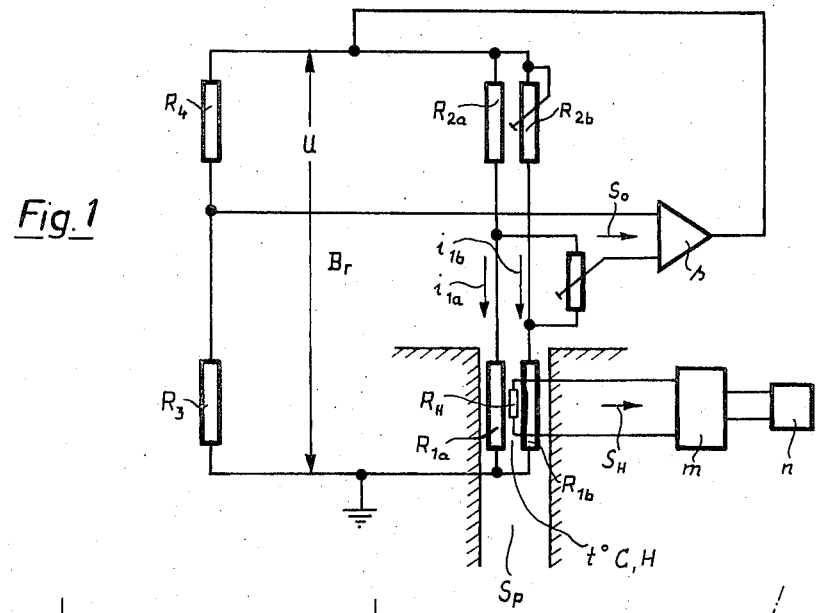

United States Patent [19]

Habfast et al.

[11] 3,818,184

[45] June 18, 1974

[54] THERMAL STABILIZATION DEVICE USING A TEMPERATURE SENSING DEVICE AND AN ELECTRICAL HEATING MEANS ESPECIALLY FOR FIELD PROBES FOR MEASURING MAGNETIC FIELD STRENGTH IN SECTORAL FIELD MASS SPECTROMETERS

[75] Inventors: Karleugen Habfast; Gerhard Heinen, both of Bremen, Germany

[73] Assignee: Varian Mat Gesellschaft mit beschrankter Haftung, Breman, Germany

[22] Filed: Feb. 16, 1972

[21] Appl. No.: 226,663

[30] Foreign Application Priority Data
Feb. 20, 1971 Germany.......................... 2108287

[52] U.S. Cl.................................. 219/504, 219/499
[51] Int. Cl.............................................. H05b 1/02

[58] Field of Search........... 219/501, 503, 505, 504, 219/499

[56] References Cited
UNITED STATES PATENTS

| | | | |
|---|---|---|---|
| 2,918,558 | 12/1959 | Evans................... | 219/499 |
| 3,215,818 | 11/1965 | Deaton................. | 219/499 |
| 3,310,656 | 3/1967 | Sproul.................. | 219/503 |

*Primary Examiner*—Bernard A. Gilheany
*Assistant Examiner*—F. E. Bell

[57] ABSTRACT

A device for thermal stabilization of a field probe using a temperature sensing device and an electrical heating element disposed in the gap of the magnet of a sectoral field mass spectrometer. The probe is disposed between bipartite NTC (negative temperature coefficient) resistance means which are coupled in a bridge circuit.

8 Claims, 4 Drawing Figures

PATENTED JUN 18 1974　　　　　　　　　　　　　　　　3,818,184

THERMAL STABILIZATION DEVICE USING A TEMPERATURE SENSING DEVICE AND AN ELECTRICAL HEATING MEANS ESPECIALLY FOR FIELD PROBES FOR MEASURING MAGNETIC FIELD STRENGTH IN SECTORAL FIELD MASS SPECTROMETERS

The invention relates to a device for thermal stabilization of a structural part, especially a measuring body, using a temperature sensing device and an electrical heating means, especially for thermal stabilization of field probes for measuring magnetic field strength in sectoral field mass spectrometers.

In the known devices of this type the temperature sensing device and heating device are separate parts with coupled circuits. The degree of exclusion of measuring inaccuracies which can be reached by this known device is unsatisfactory and the thermal stabilization is affected with undesired inertia.

It is an object of the invention to provide a thermal stabilization device in which the temperature at the spot of the temperature sensing device and the electrical heating means follow one another with very low hysteresis lag.

In the solution of this problem the invention proceeds from the consideration that the temperature sensing device and the electrical heating means for thermal stabilization must be represented by the same element in order to attain an optimal velocity and accuracy of thermal stabilization.

Proceeding from this consideration, a satisfying solution of the present problem has been achieved by providing a temperature sensing device that consists of an NTC-resistance (NTC = negative temperature coefficient) which simultaneously is active as an electric heating conductor (means) with thermal self-stabilization being arranged within a control circuit for stabilization of its resistance by resistance-dependent control of its electric current and which is connected to the structural part in such a manner that it will induce its temperature. By the combination of these two functions the heating current for thermal stabilization is active in the same element which simultaneously is active as temperature sensing device.

The device according to the invention is useful especially wherever a thermal stabilization of small solid bodies shall be performed which are closely connectable to the NTC-resistance. Such a preferred application is the thermal stabilization of a measuring probe, especially a field probe for measuring the magnetic field strength in sectoral field mass spectrometers with a close connection of measuring probe and NTC-resistance which close connection grants a quick and effective equalization of temperature.

Preferably the control circuit for resistance stabilization of the NTC resistance consists of a bridge circuit in which one branch contains the NTC resistance and in which the bridge signal controls the operating voltage of the bridge circuit in such a manner that changes of the resistance value of the NTC resistance owing to changes of temperature are compensated by changes of the operating voltage. By this means, it is possible to obtain an extreme increase of sensitivity, accuracy and inertialessness.

In order to minimize the influence of unavoidable residual variations of NTC-temperature on the results of measurement it is possible to make use of the fact that the degree of said residual variations is a function of point area within the NTC. Therefore, the effectiveness of thermal stabilization can be improved by selection of areas of low or minimal changes of temperature for the interesting thermo-sensitive probe. This may be accomplished with the combination of a measuring body, i.e., a field probe, and the NTC element in a simple manner wherein the NTC resistance is given the shape of an envelope wrapping the measuring body. For this purpose the NTC-resistance may consist of two parts the ratio of load of which is adjustable by a trimmer in such a manner, that the surface of most small variations of temperature is adjustable at the area of the measuring body between the two parts of the NTC element. With such an arrangement it is possible to realize a high-grade thermal stabilization even with NTC-resistances of grossly different geometric shape thus enabling an adaptation of the NTC also to given critical space conditions.

Figure 2:
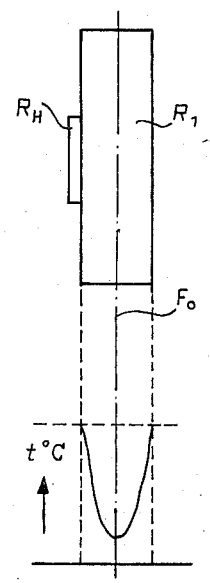
Figure 3:
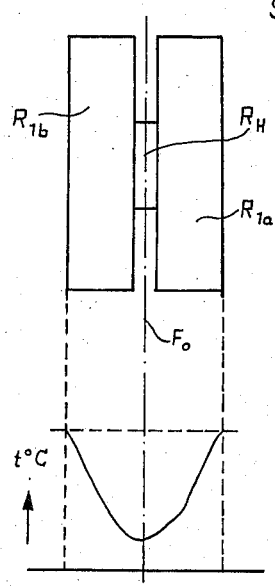
Figure 4:
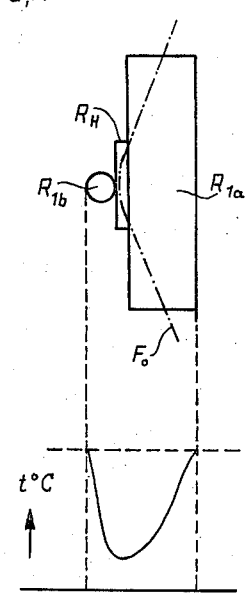

In order to make the invention clearly understood, reference will now be made to the accompanying drawings which are given by way of example and in which FIG. 1 is a circuit diagram of an arrangement according to the present invention, and FIG. 2, 3, and 4 show different NTC-resistances and the distribution of temperature through the resistance structure.

The drawing shows the application of the invention for the thermal stabilization of a field probe $R_H$, for instance a field plate having a resistance dependent on the field strength H which is brought into the gap Sp of the magnet of a sectoral field mass spectrometer.

It is known to maintain such a field probe on account of its temperature dependence at a temperature as constant as possible by arranging it within an enveloping casing having a cooling fluid flowing therethrough or surrounded by a heating coil having a high frequency heating current passing therethrough, whereby said flow of cooling fluid or passage of heating current is controlled by a temperature sensing device which is arranged in the gap Sp of the magnet.

Measurement of temperature and heating are going on within the same structural element with the result of an essentially improved control action, namely within a bipartite NTC-resistance $R_1$ ($R_{1a}$, $R_{1b}$) surrounding the field probe and lying, along with the field probe, within the magnet gap Sp. The NTC-resistance on the one side is active as a temperature sensor by using its high temperature dependence of its resistance value for measurement of temperature and on the other side is active as means for thermal stabilization by heating by controlling the electric current $i_1$ ($i_{1a}$, $i_{1b}$) running through the NTC element in such a manner that the changes of its resistance value are compensated or nullified. For this purpose the NTC-resistance $R_1$ is arranged in a resistance bridge circuit Br in which it forms one of the four branches $R_1$ ($R_{1a}$, $R_{1b}$); $R_2$ ($R_{2a}$, $R_{2b}$); $R_3$; $R_4$ and in which the bridge signal $S_o$ controls the operating voltage via a regulator S. This control circuit is proportioned and adjusted in such a manner that changes of the resistance value of NTC-resistance $R_1$ ($R_{1a}$, $R_{1b}$) resulting from variations of temperature of this resistance will be compensated by changes of the operating voltage U. By this procedure the resistance value of NTC-branch $R_1$ is stabilized by changes of the operating voltage U followed by changes of current $i_1$ ($i_{1a}$, $i_{1b}$) and corresponding changes of temperature of $R_1$. This value is always controlled with the effect of nullifying said bridge signal $S_O$.

The field probe $R_H$ which is arranged between both parts $R_{1a}$ and $R_{1b}$ of NTC-resistance $R_1$ is also permanently maintained at the even temperature of NTC-resistance $R_1$ so that the signal $S_H$ transmitted by the field probe $R_H$ is dependent only on the field strength H within magnet gap Sp and is independent of the temperature $t_a$ within magnet gap Sp. The signal $S_H$ from field probe $R_H$ is used in a known manner to indicate the mass number which is dependent on the field strength H in a mass spectrograph n.

By embedding the field probe $R_H$ within the bipartite NTC-resistance $R_1$ it is possible to obtain an essential reduction of variations of temperature at the field probe involved in the control action. Changes $\Delta t_a$ of temperature of the air space surrounding the NTC-resistance within the magnet gap Sp generate changes $\Delta t_i$ of the temperature $t_i$ of the NTC-resistance, which on their part generate changes of resistance the values of which are utilized as control signals within the bridge circuit. The changes of temperature $\Delta t_i$, however, are not equal throughout the NTC-resistance but are a maximum at the outer surface and decrease inwards to a minimum following a function as for instance is shown in FIG. 2. With a change of temperature of air in the magnet gap of i.e., $\Delta t_a = 1°C$ the change of temperature $\Delta t_i$ may reach a maximum value of $\Delta t_{imax} = 1.10^{-1°}$ C at the outside of the NTC-resistance and may decrease to a minimum value of $\Delta t_{imin} = 6.10^{-3}$ °C at the median plane $F_o$ of the NTC-resistance. Therefore, it would be desirable to arrange the field probe within said median plane $F_o$ in order to utilize the zone of minimum of temperature change for field measurement. This ideal case which practically cannot be realized, may be approached best by an arrangement shown in FIG. 3 in which the field probe $R_H$ is embedded between two equal larger platelike NTC-resistances $R_{1a}$ and $R_{1b}$. The platelike field probe $R_H$ is lying in the plane of symmetry between said NTC-plates which plane coincides to the zone of minimum temperature changes $F_o$.

For reasons of space saving it may be advisable or necessary to arrange the field probe $R_H$ like a rider upon a single platelike NTC-resistance $R_{1a}$. Even then it is possible to avoid the zone of highest changes of temperature at the outer surface of the platelike NTC-body by a construction according to FIG. 4 in which only a very small i.e., beadlike NTC-resistance $R_{1b}$ is arranged at that surface of the platelike field probe $R_H$ which is turned away from the platelike NTC-body $R_{1a}$. The proportion of currents $i_{1a}/i_{1b}$ can be adjusted by a trim resistance in such a manner that the surface of minimum temperature changes $F_o$ which is an unsymmetric construction like that of FIG. 4 assumes a convex shape passing through the field probe $R_H$.

For trimming purposes the bridge resistance $R_{2b}$ may be adjustable as shown in FIG. 1.

Many modifications and other embodiments are possible within the scope of the invention. Especially the invention is not only useful in connection with field probes but its principles may be used wherever the temperature of a structural element the thermal stabilization of which is desirable can be controlled by an NTC-resistance.

We claim:

1. A system for stabilizing the temperature of a probe or the like comprising;

a bridge circuit having a pair of input terminals across which is established an operating signal level for the bridge circuit, a plurality of resistive branches, and a pair of output terminals, one of said resistive branches comprising a resistance element having a negative temperature coefficient and disposed adjacent said probe for inducing heat generated by said resistance element to said probe.

a control circuit coupled to said negative temperature coefficient resistance element for monitoring the signal across said output terminals, and means coupled from said control circuit to one of said input terminals and responsive to a signal from said control circuit, occasioned by a change in the temperature of said resistance element, for altering the operating signal level across said input terminals.

2. The system of claim 1 wherein said plurality of resistive branches comprises four branches one of which includes said resistance element, two of said branches being connected in series and another of said branches being coupled in series with said resistance element.

3. The system of claim 1 wherein said device is used for thermal stabilization of a field probe for measuring magnetic field strength in a sectoral field spectrometer, and said resistance element comprises a support for said probe.

4. The system of claim 3 wherein said resistance element is formed as an envelope disposed about the probe.

5. The system of claim 4 wherein said resistance element comprises first and second parts having the probe disposed therebetween.

6. The system of claim 5 including a trimmer for adjusting the ratio of load of said parts so that the surface of smallest temperature variation of each part is adjustable at the area of the probe between the parts.

7. The system of claim 6 wherein said parts are substantially identical and plate-like.

8. The system of claim 5 wherein one part is in the form of a plate and the other part is beadlike and smaller than said plate.

* * * * *